US008718594B2

(12) United States Patent
Braznell

(10) Patent No.: US 8,718,594 B2
(45) Date of Patent: May 6, 2014

(54) STATUS MONITORING METHOD AND SYSTEM

(76) Inventor: Stewart Edward Braznell, Worcester (GB)

(*) Notice: Subject to any disclaimer, the term of this patent is extended or adjusted under 35 U.S.C. 154(b) by 0 days.

(21) Appl. No.: 12/998,416

(22) PCT Filed: Oct. 15, 2009

(86) PCT No.: PCT/GB2009/002471
§ 371 (c)(1),
(2), (4) Date: Aug. 16, 2011

(87) PCT Pub. No.: WO2010/043870
PCT Pub. Date: Apr. 22, 2010

(65) Prior Publication Data

US 2011/0294457 A1 Dec. 1, 2011

(30) Foreign Application Priority Data

Oct. 17, 2008 (GB) .................................. 0819065.4

(51) Int. Cl.
*H04M 11/00* (2006.01)

(52) U.S. Cl.
USPC .................... 455/404.1; 455/3.03; 455/404.2; 455/412.2; 455/418

(58) Field of Classification Search
USPC ................ 455/404.1, 3.03, 404.2, 412.2, 418
See application file for complete search history.

(56) References Cited

U.S. PATENT DOCUMENTS

| | | | | |
|---|---|---|---|---|
| 4,906,972 | A | 3/1990 | Spencer | |
| 5,333,173 | A | 7/1994 | Seazholz et al. | |
| 6,696,956 | B1 * | 2/2004 | Uchida et al. | 340/573.1 |
| 7,026,928 | B1 | 4/2006 | Lane | |
| 7,042,338 | B1 * | 5/2006 | Weber | 340/309.5 |
| 7,312,712 | B1 | 12/2007 | Worrall | |
| 7,412,264 | B2 | 8/2008 | Swallow | |
| 7,925,606 | B1 * | 4/2011 | Katzer et al. | 706/47 |
| 8,223,011 | B2 * | 7/2012 | Noury et al. | 340/539.12 |
| 2003/0091158 | A1 | 5/2003 | Puchek et al. | |
| 2003/0189485 | A1 * | 10/2003 | Smith | 340/540 |
| 2004/0199056 | A1 * | 10/2004 | Husemann et al. | 600/300 |
| 2005/0040953 | A1 * | 2/2005 | McDonald | 340/573.1 |
| 2005/0093709 | A1 * | 5/2005 | Franco et al. | 340/686.1 |
| 2005/0181771 | A1 * | 8/2005 | Cuddihy et al. | 455/414.1 |
| 2006/0099969 | A1 * | 5/2006 | Staton et al. | 455/456.4 |
| 2007/0129087 | A1 * | 6/2007 | Bell | 455/458 |
| 2007/0132578 | A1 | 6/2007 | Powell | |
| 2008/0084296 | A1 * | 4/2008 | Kutzik et al. | 340/540 |

FOREIGN PATENT DOCUMENTS

| | | |
|---|---|---|
| EP | 2006815 A1 | 12/2008 |
| GB | 2430062 | 3/2007 |
| WO | WO2005/073938 | 8/2005 |

* cited by examiner

*Primary Examiner* — Kwasi Karikari

(74) *Attorney, Agent, or Firm* — Schultz & Associates, P.C.

(57) ABSTRACT

A method for monitoring the status of a subject, the method including storing, at a monitoring station, information relating to the status of the subject, communicating a request from a first communication means associated with the monitoring station to a second communication means associated with the subject; and either communicating a response from the second communication means to the first communication means before a predetermined period of time has elapsed, or, in the absence of a timely response, updating the stored status to an alert condition.

6 Claims, 2 Drawing Sheets

STATUS MONITORING METHOD AND SYSTEM

FIELD OF THE INVENTION

The present invention relates to a status monitoring method and system. The invention has been devised, and will be described hereafter, in relation to monitoring the status of a subject which is a person (or group of persons) in terms of their well being, but may also be applicable to monitoring the status of an inanimate subject e.g. the condition or functioning of an item of equipment.

BACKGROUND OF THE INVENTION

There are many situations in which it is desirable to monitor the status of well-being of a person. Such situations include, but are not limited to, an elderly or vulnerable person living alone, a person suffering from a disability, and a person working in a dangerous environment. In such circumstances it is advantageous, in terms of the costs involved in carrying out the monitoring, for the monitoring to be carried out by an automated process. Furthermore, the automation of such a process removes the opportunity for human error.

It is known for communication devices to be used to raise an alarm when a button is pressed. This method is inadequate in the case where a subject may be rendered unable to make such a communication, such as the case where an elderly person suffers a fall, or where a worker in a dangerous environment becomes unconscious. In these situations, proactive monitoring is required, wherein a request is made to the subject asking them to provide a response to indicate that they are well. If no such response is received, the system can alert others to the situation.

However, it is possible that a system of this nature is open to abuse in the case where a response is made to the request by the system, but the response is sent by someone other than the person being monitored. In this instance, the alarm will not be raised, and hence the well-being of the subject put at risk.

It is broadly the object of the present invention to address such problems.

SUMMARY OF THE INVENTION

According to one aspect of the invention, we provide a method for monitoring the status of a subject. The method may include storing, at a monitoring station, information relating to the status of the subject, communicating a request from a first communication means associated with the monitoring station to a second communication means associated with the subject; and either communicating a response from the second communication means to the first communication means before a predetermined period of time has elapsed, or, in the absence of a timely response, updating the stored status to an alert condition.

The steps of communicating a request from the first communication means to the second communication means; and either communicating a response from the second communication means to the first communication means before the predetermined period of time has elapsed, or updating the stored status to alert, may be repeated after a stored predetermined time interval. The times allowed for response from the second communication means, and for repeating the steps as aforesaid, may be stored in a memory, which also may store information denoting operating times outside which no request communications are made to the second communicating means.

Preferably a personal identifier relating to the subject is stored in the memory, and a response from the second communication means to the first communication means includes communicating the personal identifier. If the personal identifier in such communication does not match the relevant stored personal identifier, the response may be regarded as invalid and lead to the stored status of the subject to be changed to the alert condition.

It is beneficial to require the subject to communicate a personal identifier in the response, so that the system knows the response has been sent by the target subject. The personal identifier corresponding to the target subject may be stored in the memory of the system for this purpose, and may be associated with a unique identifier attributed to the communication device being used, such as a Machine Access Control (MAC address), telephone number, or Internet Protocol (IP) Address.

Commonplace technology, such as mobile telephones, paging devices, home telephones, or home computers, may incorporate an interface enabling the subject to communicate with the system via the communication means. It is also possible that no adaptation of communication devices is necessary, as communications can be sent and received over existing technologies which do not implement a bespoke interface. In either case, there is no need for separate equipment to be carried or installed, as the communications can operate through standard devices.

Motion of the subject may be detected using a motion-detecting means and if no such motion is detected during a predetermined time period, or if such motion falls within the bounds of a preset pattern over time, an alert condition can be set. It is preferable that the motion-detecting means, e.g. one or more accelerometers, is incorporated within the communication device associated with the subject, such as a mobile telephone.

A communication means such as a mobile telephone, having one or more accelerometers or other motion-detecting means, may also be programmed to cause an alert condition to be established when used in a system other than that in accordance with the present invention.

The means of communication involved in such a system can include, but are not limited to, voice communications (including Voice over Internet Protocol), text messages, electronic mail, interaction with web applications, and any other means of data packet transfer.

Such a system can incorporate an alert escalation procedure, wherein after an alert is raised, where no communication has been received from the subject, communications are sent to one or more further communication means in accordance with alert procedural information stored in the memory. For example, if a worker is injured and does not respond to a status request, the system may alert a colleague to the situation. After a set period, if that colleague has not responded, the system may alert a manager.

It is possible that a worker in such a situation may wish to raise an alarm manually, rather than waiting for a status request to go unanswered. In this case, a communication can be sent to the system, setting the status to alert with immediate effect.

According to another aspect of the invention, we provide apparatus for carrying out the method according to the first aspect of the invention.

BRIEF DESCRIPTION OF THE DRAWINGS

Embodiments of the invention will now be described, by way of example only, with reference to the drawings.

DETAILED DESCRIPTION

Figure 1:
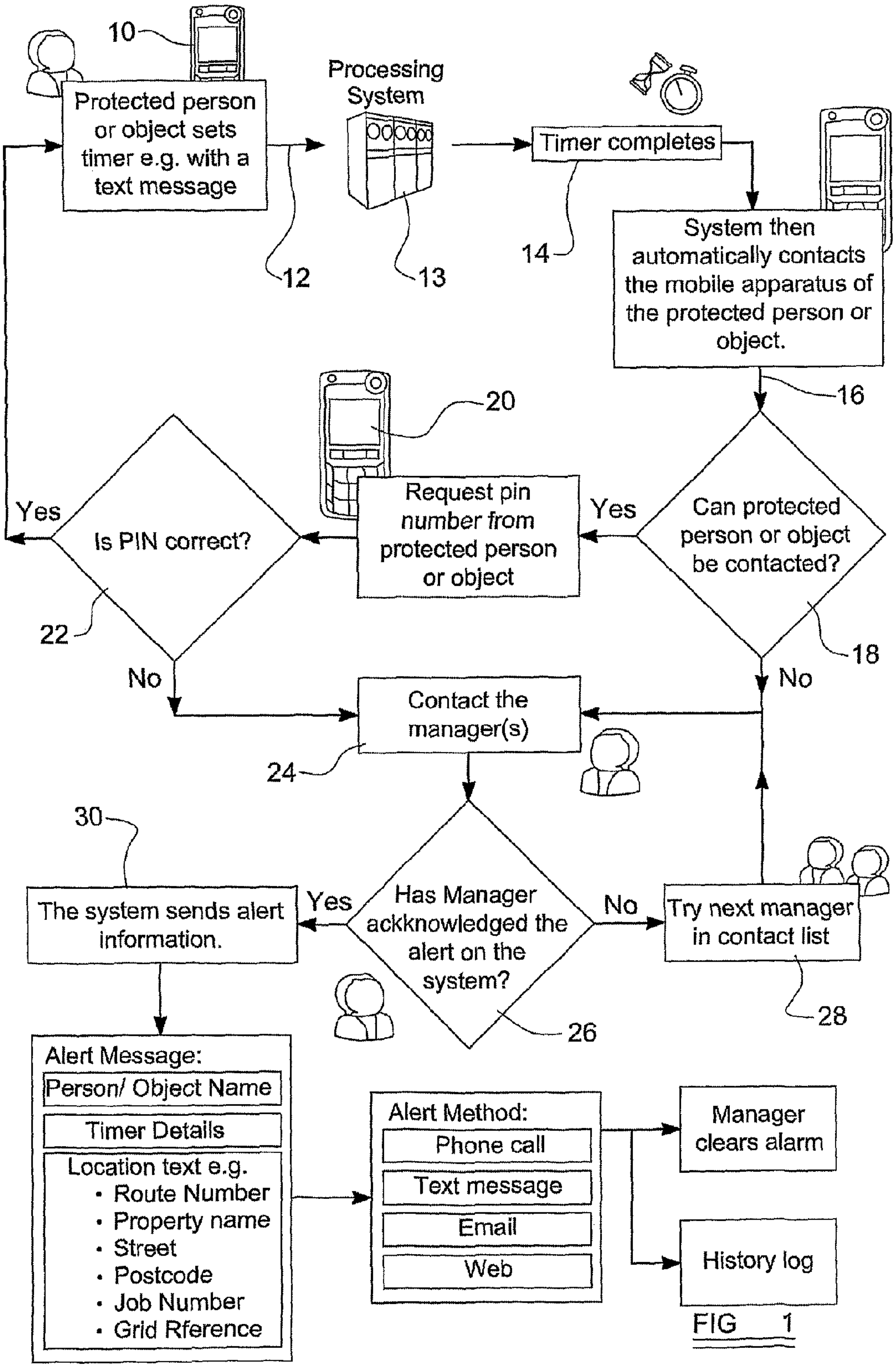
FIG. 1 is a diagrammatic illustration of the elements and operation of a status monitoring system in accordance with the invention, for monitoring workers in dangerous environments.

Referring first to FIG. 1, there is shown a diagrammatic representation of the main elements, and operation, of a status monitoring system, which is suitable for monitoring the status of workers operating in dangerous environments. The system includes a first and a second communication means, a memory and a processor. The memory, processor, and first communication means may be included in or associated with a computer/server 13 operating in accordance with suitable software to enable it to perform the steps described herein. The first communication means is associated with the memory and processor to form a monitoring base station from which the monitoring takes place, and the second communication means is carried, or is otherwise operable, by the worker being monitored. The second communication means may comprise a mobile (cellular) telephone or any other personal communications device, and the first communication means be suitable for sending data to such a device and receiving data therefrom.

Prior to beginning operation, information may be recorded in the memory, this information including the names of subject persons being monitored linked with personal identifiers (or 'PIN' numbers), locations, a time interval between sending response requests to the or each subject, a time limit for the subject(s) to respond to a request, a device identification (which may take the form of a machine access code, telephone number or internet protocol address), and procedural information to be acted upon when an alert status is entered. Alternatively, the subject may set all or any of the information by sending the information via a communication to the first communication means, and the system may then record this information in the memory.

The monitoring system may begin operation to monitor a subject when the second communication means (10) carried by or otherwise operable by the subject sends an initialising communication (12), which may be an initialising communication as described above or may be a standard initialising communication containing less information. Alternatively, monitoring may begin at a set time. Upon receipt at the base unit, a timer (14) starts operating, to measure a set time interval since the initialising or any subsequent communication (as described hereafter) from the subject has been received. The set time may be a default time interval, or a time recorded in the memory of the system to be associated with a particular subject (e.g. sent by the subject as referred to above). After the set time has elapsed, a request is sent, as indicated at (16), to the second communication means associated with the particular subject if contact can be established with the second communication means, as indicated at (18), and if a personal identifier associated with that subject is recorded in the memory, a request is sent from the first communication means to the second communication means to ask the subject for confirmation of the personal identifier in a return communication. Assuming a personal identifier is received from the second communication means, it is tested for its correctness, i.e. agreement with the stored relevant personal identifier, as indicated at (22), and assuming it is correct the timer (14) is restarted. The system notes that the status of the subject remains unchanged. The communication from the subject may contain additional details including location, status, and job status. If the personal identifier does not match that recorded in the memory, a further communication may be sent to the subject asking for resending of the identifier, and this step may be repeated more than once, to allow for the possibility of personal error without noting any change in the recorded status of the subject.

If it is found, as a result of step (18) or (20) that no response at all can be obtained from the subject, or that no correct personal identifier is received, within the set time limit, the status of the subject is updated to 'alert' ('alarm activated'). Once this status has been set, information relating to an alert procedure for the subject in question is retrieved from the memory: this information will include details for contacting further communication means associated with a further person or persons, e.g. one or more colleagues and/or managers of the subject, to enable such further persons themselves to check the well-being of the subject, and/or the emergency services. The alert procedural information may require that a message initially is sent to a colleague of the subject, and in the absence of any response from that colleague, that a message is sent after a pre-determined elapsed time to a more senior figure. This allows for an escalation procedure to be defined wherein other parties are contacted in a specified order, until one or more parties respond to the contact in a satisfactory way.

With reference to FIG. 1 of the drawings, a negative response to either of the steps (18) or (20) causes the alarm escalation procedure to be initiated, drawing the alarm procedural information from the memory of the system and initiating the step before contacting further communication means. Depending on whether or not the person/communication means first contacted in step (24) responds to the contact (26), either the next person on the alert contact list is contacted (28), or an alert message is sent to the first-mentioned contact (30). It would be possible, when an alert status is established, for more than one person or communication means to be contacted at the same time as part of the procedure, and appropriate means of communication may be utilised.

The alert message may include details drawn from the memory of the system, which may include (but not be limited to) the name or other identifier of the subject in question in respect of whom the alert has been raised, and/or when the timer relating to that subject expired and/or the last known location of the subject in question and/or the status of the task upon which the subject was known to be working and/or the last time the subject responded to an attempt to establish contact and/or the job number of the working being undertaken and/or the schedule of jobs assigned to the worker and/or the position of the worker on a predefined route. This information can be used by the recipient of the alert message to attempt to contact the subject, or to identify his location or to check his status personally.

Once the contacted party has dealt with the situation and ensured the well-being of the subject, a message can be sent to the first communication means instructing the system to reset, with a status of the subject reverting to normal. Normal monitoring of the subject may then continue. It would of course be possible for the subject to communicate with the system at any point during the above procedure, with the appropriate personal identifier, to cause the system status with regard to that subject to be returned from alert to normal, and the alert procedure cancelled. Preferably the system provides for a subject to send a communication at any time from the second communication means to the first communication means to indicate that the status should be changed to the alert status. Such a communication may take the form of a telephone call to a specific number, or an e-mail, or text message, or any other form of communication. If this is done, the alert procedure is initiated as described above. By this means, a subject may request assistance at any time.

It is known that mobile telephones can incorporate accelerometers to detect motion of the telephone in one or more directions. If the telephone is carried by a person, and no motion is detected over a period of time, this may indicate that the person has been incapacitated in some way. Alternatively, a pattern of motion including a sudden motion followed by a static period might indicate that the person has fallen, or else a pattern of repeated still periods could indicate that an alert status should be set, depending on the situation. A telephone can be programmed to initiate a communication with the system in order to indicate that the status should be changed to the alert status. Alternatively, the telephone may be programmed to ring, and to initiate an alert communication to the system if the ringing does not provoke a response from the subject within a predefined time period.

A record of the motion detected by the telephone may be recorded in graphic format, as a continuous graph over the period in which monitoring takes place. An irregular pattern might be spotted by a colleague monitoring the graph and in the case where an alert status has not been set, the colleague might, as a precautionary step, initiate a communication with the person being monitored. Alternatively, if an alert status is set, the graph may be studied in order to gain some indication from the pattern of motion as to what might have caused the alert.

In general, any convenient form of data communication may be used for communication between the first and second communication means. For example, a (pre-recorded) voice telephone call may be sent, a SMS or other text message, an e-mail, or in the case of suitably enabled communication devices, a web page. This may be responded to by a corresponding or other type of message including the personal identifier. By way of example only, in the case of a subject responding by text message to send a personal identifier number, the following or preceding of that number with a predetermined character or series of characters may initiate the monitoring process or stop the monitoring process when the current task of the subject has been completed. Upon receipt of a message causing initiation of the monitoring procedure, a message may be sent requiring the subject to provide certain information, for example a detailed address or the like, enabling the location of the subject to be established with a high degree of accuracy.

Figure 2:
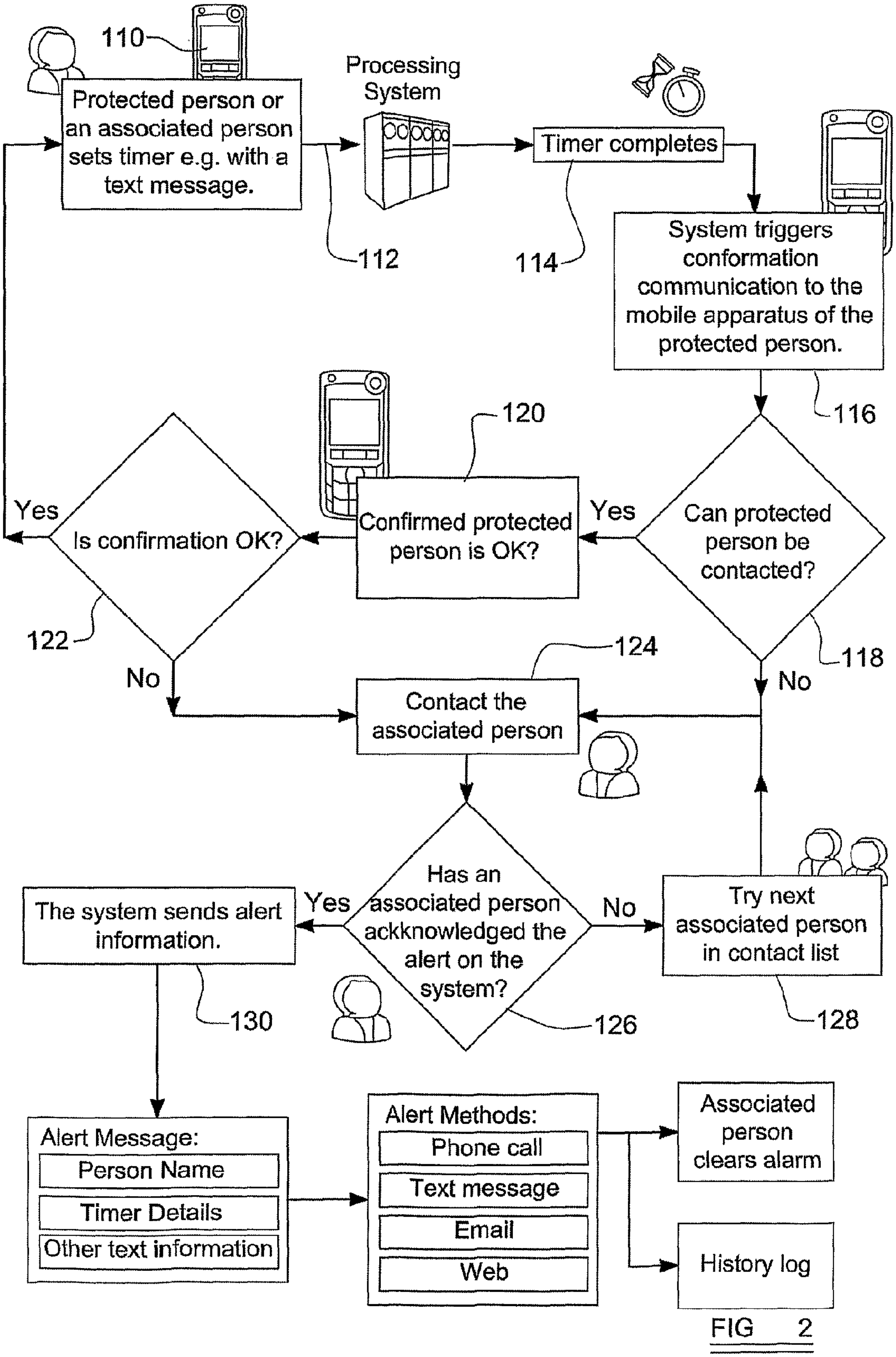
FIG. 2 is a diagrammatic illustration of a status monitoring system for monitoring vulnerable persons.

Referring now to FIG. 2 of the drawings, this illustrates the operation of an alternative embodiment of status monitoring system, monitoring a subject such as a vulnerable person, for example an elderly or disabled person. In principle, this is very similar to what is shown in FIG. 1, and corresponding parts/steps are indicated by the same reference numerals used in FIG. 1 but with the addition of 100. Thus, the monitoring system includes a first communication means, a processor and a memory, and a second communication means which is provided for use by the vulnerable person. The second communication means may be hand-held, as in the case of a mobile telephone or pager, or alternatively may be a static device, provided on the wall of an apartment for instance. The memory of the monitoring system stores details of the person being monitored, including, but not limited to: their location or address, any medical conditions suffered, details of a suitable time interval between monitoring requests, and an alert escalation procedure. In addition, the memory has to store details enabling contact to be made with the second communication means.

To start operation of the system, a communication may be sent from the second communication means (110), as shown at (112), to start operation of the time (114). Once the system is in operation, request messages are communicated to the subject, being sent (116) from the first communication means to the second communication means at intervals specified in accordance with the time information stored in the memory. The subject is then required to indicate his/her status by sending a communication (120) from the second communication means to the first communication means. The indication of status may take the form of a message containing text, or may be given by the operation of a single reply button in the case of a mobile telephone, pager, or dedicated device installed in the subject's home premises, for example. Unlike the embodiment of FIG. 1, the system may not call for a personal identifier to be communicated, as this adds complication and, in the case of an elderly person it may be difficult for him/her to recall the personal identifier at the time when it is required. When the subject has sent a communication, it is checked for being satisfactory (122), and if a satisfactory status has been communicated, the status stored in the memory remains as normal. If no satisfactory communication of status is received by the first communication means after a set period of time stored in the memory, or if communication with the second communication means cannot be established within a stored time interval, the status in the memory is updated to alert, and the alert procedure recorded in the memory is followed.

The alert procedural information may include details of people and/or devices to contact once the status has been set to alert. This information may include details of relatives, carriers, wardens, and so forth. The recorded information may also include a contact telephone number, electronic mail address, or any alternative means of making contact with each of the parties specified.

Analogously to the embodiment of FIG. 1 of the drawings, in the alert procedure a communication may be sent to a first person as indicated at (124), and if communication with that person is satisfactorily established (126) the alert information may be sent to that person. If the first communication with an associated person is not established, the next associated person in the alert procedure contact list is sent a communication (128). Once communication has been established with a person on the alert procedure list, an alert message is sent (130) to that position, including relevant details relating to the subject in question, to enable checking of their well-being. Once the situation has been dealt with and the well-being of the subject ensured, a message can be sent to the first communication means instructed in the system to reset to normal status of the subject, and normal monitoring of the subject to continue.

As in the embodiment first described, any suitable form of data communication may be used for communication between the respective parties.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for monitoring a status of a subject, the method including:

storing, at a monitoring station, in a memory, a stored status including a set of information related to the status of the subject including a time of last response from the subject, a first personal identifier associated with the subject and at least one of the group of: a last known task of the subject, a last known task status, a job number and a schedule of jobs;

communicating a first request from a first communication means associated with the monitoring station to a second communication means associated with the subject;

one of communicating a response from the second communication means to the first communication means before a predetermined period of time has elapsed, and in the absence of the response, updating the stored status to include an alert condition, and communicating an alert message, including the time of last response from the subject and at least one of the group of: the last known task of the subject, the last known task status, the job number, and the schedule of jobs from the first communication means to one or more further communication means;

wherein communicating a response from the second communication means to the first communication means includes communicating a second personal identifier;

the response is determined to be invalid if the second personal identifier does not match the first personal identifier; and, if the response is invalid, then sending a second request, from the first communication means to the second communication means, for the second personal identifier.

2. The method according to claim 1, further including communicating initializing information from the second communication means to the first communication means, the initializing information being stored in the memory, the initializing information including at least one of the group of:

the subject's name, the stored personal identifier, a location, a status, a time interval between response requests, and a time limit on response time.

3. A method for monitoring a status of a subject, the method including:

storing, at a monitoring station, in a memory, a stored status including a set of information related to the status of the subject including a time of last response from the subject, a first personal identifier, and at least one of the group of: a last known task of the subject, a last known task status, a job number and a schedule of jobs;

communicating a first request from a first communication means associated with the monitoring station to a second communication means associated with the subject;

one of communicating a timely response, including a second personal identifier, from the second communication means to the first communication means before a predetermined period of time has elapsed, and in the absence of the timely response, updating the stored status to include an alert condition, and communicating an alert message, including the time of last response from the subject and at least one of the group of: the last known task of the subject, the last known task status, the job number, and the schedule of jobs from the first communication means to one or more further communication means;

recording a device identification in the memory when a communication is received by the first communication means;

referencing the device identification of a communication received by the first communication means, against a previously recorded device identification; and, if the second personal identifier does not match the first personal identifier, then sending a second request, from the first communication means to the second communication means, for the second personal identifier.

4. A system for monitoring the status of a subject including a monitoring station having a computer server, a processor and a memory comprising:

a first communication means controlled by the computer server;

at least one second communication means associated with the subject;

a timer, controlled by the computer server, which measures a response time between a first request, from the first communication means to the second communication means, and a response, from the second communication means;

the computer server further including a set of program instructions in the memory, that when executed by the processor:

store, in the memory, a set of subject information relating to the status of the subject including a last known task of the subject, a first personal identifier associated with the subject, and an alert procedure;

communicate the first request and initialize the timer to determine the response time;

if the response time is within a predetermined period of time, then receive the response including a second personal identifier, communicate the first request again and restart the timer;

if the response time is longer than the predetermined period of time, then set an alert condition;

determine the response to be invalid set the alert condition and communicate a second request, from the first communication means to the second communication means, for the second personal identifier, if the second personal identifier does not match the stored personal identifier; and, upon the alert condition, communicate an alert message including the subject information and the response time from the first communication means to one or more further communication means, as specified in the alert procedure.

5. The system according to claim 4, further including initializing information communicated from the second communication means to the first communication means and stored in the memory, the initializing information including at least one of the group of:

the subject's name, the stored personal identifier, location, status, a time interval between response requests, and a time limit on response time.

6. A system for monitoring the status of a subject including a monitoring station having a computer server, a processor and a memory comprising:

a first communication means controlled by the computer server;

at least one second communication means associated with the subject;

a timer, controlled by the computer server, which measures a response time between a first request, from the first communication means to the second communication means, and a response, from the second communication means;

the computer server further including a set of program instructions in the memory, that when executed by the processor:

store, in the memory, a set of subject information relating to the status of the subject including a last known task of the subject, a first personal identifier and an alert procedure;

communicate the first request and initialize the timer to determine the response time;

if the response time is within a predetermined period of time, then receive the response including a second personal identifier, communicate the first request again and restart the timer;

if the response time is longer than the predetermined period of time, then set an alert condition;

upon the alert condition, communicate an alert message including the subject information and the response time from the first communication means to one or more further communication means, as specified in the alert procedure;

record a device identification in the memory when a communication is received by the first communication means;

reference the device identification of a communication received by the first communication means, against a previously recorded device identification; and, if the second personal identifier does not match the first personal identifier, then communicating a second request, from the first communication means to the second communication means, for the second personal identifier.

* * * * *